(12) United States Patent
Priepke et al.

(10) Patent No.: US 10,023,389 B1
(45) Date of Patent: Jul. 17, 2018

(54) EXTENDABLE UNLOAD CONVEYOR FOR COMBINE

(71) Applicant: CNH Industrial America LLC, New Holland, PA (US)

(72) Inventors: Edward H. Priepke, Lancaster, PA (US); Denver Romayne Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/494,939

(22) Filed: Apr. 24, 2017

(51) Int. Cl.
| B65G 21/14 | (2006.01) |
| B65G 21/00 | (2006.01) |
| B65G 21/10 | (2006.01) |
| B65G 15/26 | (2006.01) |
| B65G 15/08 | (2006.01) |
| B60P 1/38 | (2006.01) |

(52) U.S. Cl.
CPC ............... B65G 21/14 (2013.01); B60P 1/38 (2013.01); B65G 15/08 (2013.01)

(58) Field of Classification Search
None
See application file for complete search history.

(56) References Cited

U.S. PATENT DOCUMENTS

| 6,261,050 B1 * | 7/2001 | Kuhns .................. B60P 1/42 198/671 |
| 6,805,229 B2 | 10/2004 | Dekoning |
| 7,874,899 B2 | 1/2011 | Mackin et al. |
| 8,241,098 B1 * | 8/2012 | Latimer ................. A01F 12/46 198/313 |
| 8,398,469 B2 * | 3/2013 | Coers ................. A01D 41/1217 198/313 |
| 9,315,327 B2 | 4/2016 | Priepke |
| 2014/0315608 A1 | 10/2014 | Novlan |
| 2015/0132093 A1 | 5/2015 | Biggerstaff et al. |

* cited by examiner

Primary Examiner — Kavel Singh
(74) Attorney, Agent, or Firm — Peter K. Zacharias; Patrick M. Sheldrake

(57) ABSTRACT

A conveyor system for unloading crop material from an agricultural harvester includes an adjustable-length discharge tube. The discharge tube includes at least a first tube section and a second tube section, the first tube section movably attached to the second tube section in an adjustable arrangement. The first tube section and the second tube section are each hollow and collectively define a passage for conveying crop material through the discharge tube. One of the first tube section and the second tube section is movable relative to the other of the first tube section and the second tube section to adjust the length of the discharge tube. One of the tube sections can be telescopically received in another of the tube sections. In addition, or in the alternative, one of the tube sections can be pivotally attached to another of the tube sections.

20 Claims, 5 Drawing Sheets

EXTENDABLE UNLOAD CONVEYOR FOR COMBINE

FIELD OF THE INVENTION

The present invention relates generally to automated conveying systems, and more particularly to an extendable conveyor system for an agricultural vehicle, the conveyor system featuring one or more adjustable extension tubes and/or extension spouts for uploading crop material from the agricultural vehicle.

BACKGROUND

To increase productivity, agricultural vehicles, such as combines, are becoming larger, headers are becoming wider, and travel speeds are increasing during harvest. Additionally, harvesting operations in a large field often involve simultaneous harvesting and unloading of harvested crop material (sometimes referred to in the art as unloading "on the go"). Typically, the combine has an unloading system that includes an unloading tube containing a helical auger. The auger is deployed for unloading crop material from an on board grain tank into an accompanying receiving container, such as a tractor pulled cart, wagon, truck, trailer, or the like. Unloading tubes cover the grain as it is unloaded, minimizing grain loss that would otherwise occur if the grain were exposed to windy conditions and other elements. However unloading systems that utilize augers have been found to be slower than desired for many agricultural operations. Also, as a consequence of necessary spacing between the auger flight edges and the interior surface of the unloading tube, the crop material can be damaged therebetween.

Belt in tube conveyors can provide a superior alternative to auger type conveyors. The belts are lighter, less costly, can be operated at faster speeds than augers, and thus have higher discharge capacity. Belt in tube conveyors can also deliver the crop material in a more continuous manner with less vibration. In general, it has been found that conveying crop material using belts results in less crop damage than augers.

There are a number of operational challenges when using grain unloading systems, particularly when unloading on the go. One of the challenges is providing an unloading system with a suitable length. When unloading grain from an agricultural harvester on the go, the harvester and the truck moving alongside the harvester must maintain an adequate clearance or spacing between them. Larger headers on combines require the truck to be positioned a significant distance away from the combine to avoid collision between the truck and the header. In such cases, the unloading system must be very long to traverse the clearance space and reach the right location in the truck to properly unload crop material from the combine. Longer unloading systems pose a challenge because they add significant weight to the harvester and increase the vehicle footprint during transport. In addition, longer unloading systems are not required for every operation. For example, a harvester might be equipped with a large header for one crop, requiring a much longer unloading system, and subsequently be equipped with a much smaller header for a different crop. As the smaller header would require much less clearance, the longer unloading system would be unnecessary and possibly difficult to use.

Another challenge with longer unloading systems is the difficulty in bringing the discharge end to a centered position relative to a grain cart or trailer to receive the unloaded grain. Centering of the conveyor relative to the cart or trailer is necessary in order to get a full load of grain in the cart or trailer without spillage.

Still another challenge with unloading systems is adequately protecting grain as it exits the unloading system into a receptacle. Unless the length of the unloading system occupies the entire distance between the harvester and grain receptacle, there will be a gap or clearance between the discharge end of the conveyor and the grain receptacle. Grain that exits the unloading system and enters the gap will be unprotected from wind and other elements in mid-air. If the gap is relatively large, and discharged grain is subjected to winds, the grain can be blown away and lost. Large gaps also make it difficult to control and direct the stream of grain after it exits the unloading system. Moreover, if the end of the unloading system is spaced too far apart from the receptacle, any stoppage or deceleration of the unloading system can cause a significant volume of grain in mid-air to drop straight down or fall short of the receptacle, resulting in grain loss if there is nothing in place to receive the fallen grain.

SUMMARY

The drawbacks of conventional grain unloading systems are addressed in many respects by extendable unloading systems in accordance with the invention that feature one or more extension tube sections and/or one or more extension spouts that are configurable to infinitely adjust the length and/or discharge characteristics of the unloading system, while remaining fully compatible with high speed belt and belt in tube conveyors.

According to one embodiment of the invention, a conveyor system for unloading crop material from an agricultural harvester can include an adjustable-length discharge tube for discharging crop material from the agricultural harvester to a location for receiving crop material. The discharge tube can include an intake end for receiving crop material into the discharge tube, and a discharge end for discharging crop material from the discharge tube. The discharge tube can further include at least a first tube section and a second tube section. The first tube section can be movably attached to the second tube section in an adjustable arrangement. In addition, the first tube section and the second tube section can each be hollow, collectively defining a passage for conveying crop material through the discharge tube. Moreover, the first tube section and the second tube section can be movable relative to the one another to adjust the length of the discharge tube.

In the same embodiment or a different embodiment of the invention, the first tube section can be movably attached to the second tube section in a telescoping arrangement, with one of the first tube section and second tube section being axially displaceable relative to and receivable within the other of the first tube section and the second tube section.

In the same embodiment or a different embodiment of the invention, an endless conveyor belt can extend through and be movably displaceable within at least a portion of the discharge tube.

In the same embodiment or a different embodiment of the invention, the system can include a drive mechanism operable to move the conveyor belt through the discharge tube to convey crop material through the passage in the discharge tube.

In the same embodiment or a different embodiment of the invention, the conveyor system can include a drive mechanism having a drive roller positioned in proximity to the intake end of the discharge tube.

In the same embodiment or a different embodiment of the invention, the conveyor system can include an extension actuator attached between a first tube section and a second tube section, the extension actuator configured to axially displace one of the first tube section and the second tube section relative to the other of the first tube section and the second tube section to change the length of the discharge tube.

In the same embodiment or a different embodiment of the invention, the extension actuator can be configured to axially displace one of the first tube section and the second tube section relative to the other of the first tube section and the second tube section between a fully retracted condition and fully expanded condition, the discharge tube having a minimum length when in the fully retracted condition, and a maximum length when in the fully expanded condition.

In the same embodiment or a different embodiment of the invention, the extension actuator can be a hydraulic cylinder.

In the same embodiment or a different embodiment of the invention, the conveyor system can include a constant force take up system attached to one of the first tube section and the second tube section, the constant force take up system maintaining a substantially constant tension in the conveyor belt during axial displacement of one of the first tube section and the second tube section relative to the other of the first tube section and the second tube section.

In the same embodiment or a different embodiment of the invention, the conveyor system can include a constant force take-up system featuring a hydraulic cylinder or a mechanical spring system mounted to one of the first tube section and the second tube section.

In the same embodiment or a different embodiment of the invention, the conveyor system can include a constant force take-up system featuring a take-up roller connected to the hydraulic cylinder or the mechanical spring system.

In the same embodiment or a different embodiment of the invention, the conveyor system can include a first tube section telescopically received in a second tube section.

In the same embodiment or a different embodiment of the invention, the conveyor system can include a first tube section having a first anti-rotation feature, and a second tube section having a second anti-rotation feature that cooperatively engages the first anti-rotation feature to limit rotation of the second tube section relative to the first tube section.

In the same embodiment or a different embodiment of the invention, the conveyor system can include a third tube section.

In the same embodiment or a different embodiment of the invention, the conveyor system can include a third tube section with an extension spout, the extension spout having a spout length and a discharge opening.

In the same embodiment or a different embodiment of the invention, the conveyor system can include an extension spout pivotally connected to a distal end of one of a first tube section and a second tube section by a hinge.

In the same embodiment or a different embodiment of the invention, the conveyor system can include a hinge with an axis normal to the axis of discharge tube.

In the same embodiment or a different embodiment of the invention, the conveyor system can include an extension spout pivotally displaceable through an angle of about 180 degrees between a stowed position, in which the extension spout is folded proximally with the discharge opening located proximal to the hinge, and an extended position, in which the extension spout projects distally with the discharge opening located distal to the hinge.

In the same embodiment or a different embodiment of the invention, the conveyor system can include an extension spout and at least one alternate extension spout, the at least one alternate extension spout having a spout length that is different from the spout length of the extension spout, and being interchangeable with the extension spout to adjust the length of the discharge tube.

In the same embodiment or a different embodiment of the invention, the conveyor system can include a second tube section in the form of an extension spout pivotally connected to a distal end of the first tube section by a hinge.

BRIEF DESCRIPTION OF THE DRAWINGS

For the purpose of illustration, there are shown in the drawings certain embodiments of the present invention, not shown to scale. It should be understood that the invention is not limited to the precise components, arrangements, dimensions, and instruments shown. Like numerals indicate like elements throughout the drawings. In the drawings.

DETAILED DESCRIPTION

Various terms are used herein to indicate the position of features, or the direction of movement of features, with respect to an agricultural vehicle. Unless noted otherwise, the terms "proximal", "proximally", "inward", "inwardly" and the like refer to positions that are closer to the center of the vehicle, and directions that are oriented toward the center of the vehicle. The terms "distal", "distally", "outward", "outwardly" and the like refer to positions that are farther from the center of the vehicle, and directions that are oriented away from the center of the vehicle.

Figure 1:
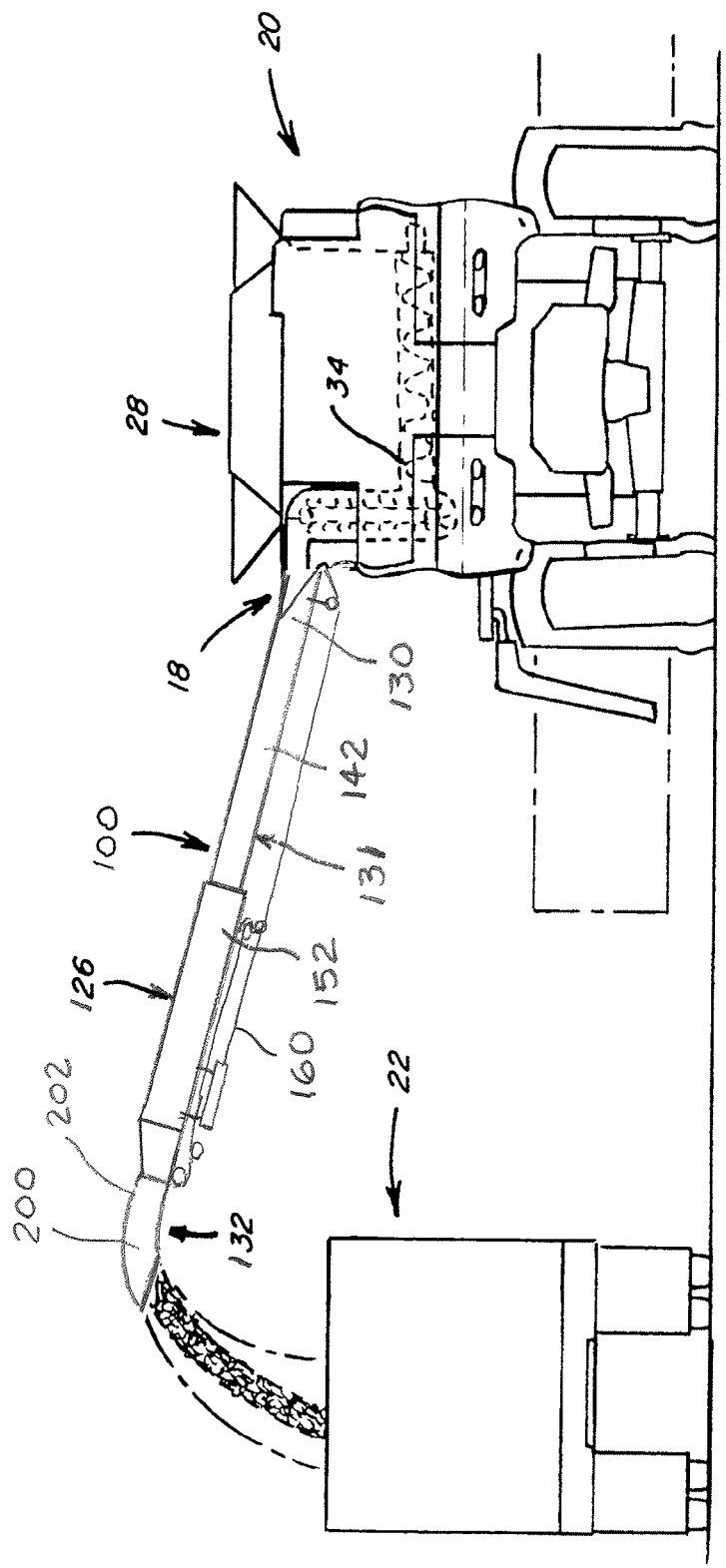
FIG. 1 provides a perspective view of an exemplary embodiment of an agricultural combine during an unloading operation, the combine comprising a grain unloading system in accordance with an exemplary embodiment of the invention.

Referring now to the drawings, wherein exemplary embodiments of the present invention are shown, FIG. 1 illustrates a belt in tube conveyor system (hereinafter, "conveyor system") 100 in accordance with one embodiment of the invention. Conveyor system 100 is incorporated onto a representative agricultural vehicle, which is shown in FIG. 1 as a combine 20. Combine 20 includes a transfer conveyor system 34 for conveying crop material from an on-board grain tank 28 in the combine to the conveyor system 100. Transfer conveyor system 34 can be of conventional construction and operation.

Conveyor system 100, which is adapted for use as an unloading conveyor for combine 20, is shown in a deployed position extending sidewardly and outwardly from combine 20. In this position, conveyor system 100 is configured to unload crop material from grain tank 28 into a truck 22 moving along one side of combine 20 as shown. Conveyor system 100 can be used in a similar manner to unload crop material into a tractor pulled cart, wagon, trailer, or other receptacle, which may either be stationary or moving during the unloading operation. As can be observed in FIG. 1, conveyor system 100 is advantageously inclined upwardly and outwardly relative to combine 20 to provide clearance for passage and placement over a variety of receiving containers.

Conveyor system 100 includes a discharge tube 126 having an open intake end 130 that receives crop material from transfer conveyor system 34. Discharge tube 126 also has an open discharge end 132 opposite the intake end 130. A tubular passage 131 is defined between intake end 130 and discharge end 132. As will be described, belt in tube conveyor systems in accordance with the invention can include two or more tube sections arranged in an axially-extendable or telescoping assembly. As will be explained, a telescoping connection between the two or more tube sections allows the length of the discharge tube to be infinitely adjusted between a fully retracted condition and a fully expanded condition.

Belt in tube conveyor systems in accordance with the invention also include a system of rollers, extension mechanisms, and belt take-up mechanisms that allow the belt to change shape as the tube sections move telescopically, while at the same time maintaining constant tension on the belt. As such, conveyor belts in accordance with the invention can adapt to different discharge tube lengths, unlike conventional auger systems. The ability to infinitely adjust the length of the discharge tube, while maintaining constant tension on the belt, allows the system to accommodate a wide range of clearances, including very short clearances and very long clearances. As such, belt in tube conveyor systems in accordance with the invention can work with different header sizes and accommodate changes in operating conditions which increase or decrease the required clearance needed between the combine and the truck, or other grain receptacle.

Figure 2:
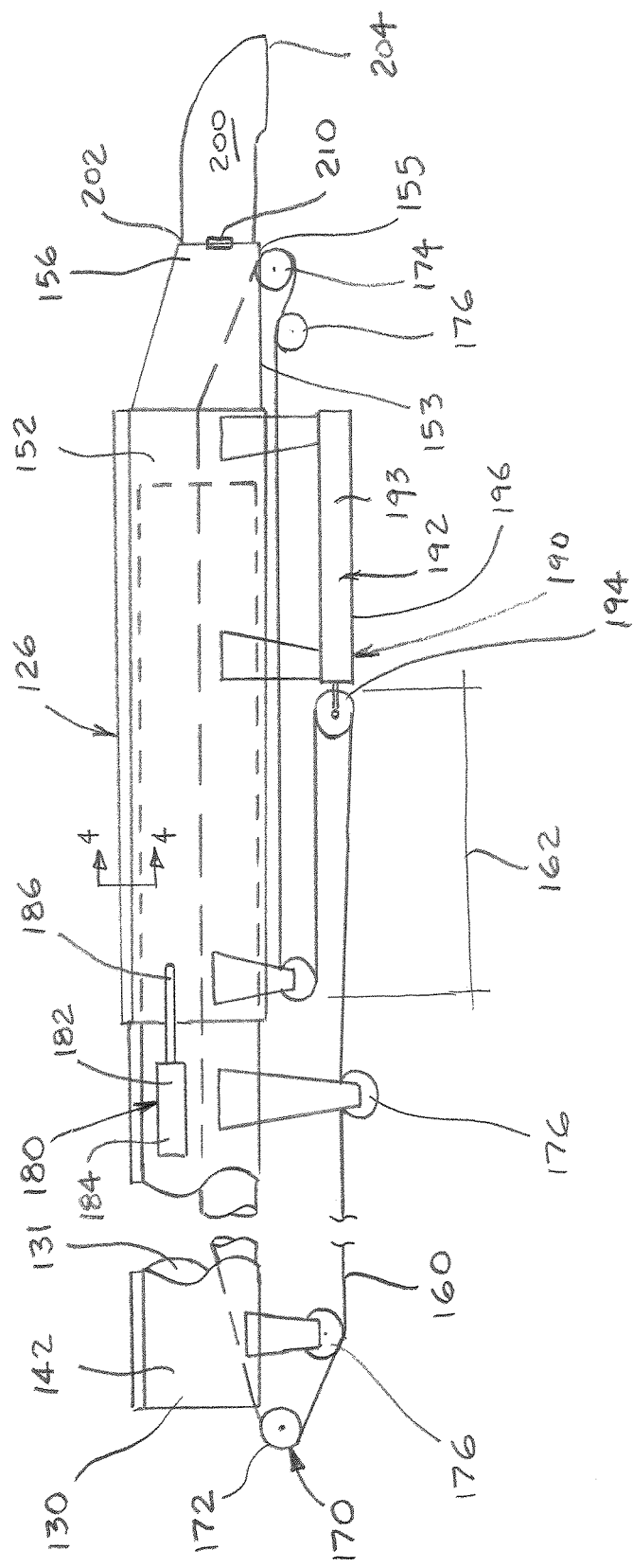
FIG. 2 provides a truncated elevation view of the grain unloading system of FIG. 1, with grain unloading system shown in a retracted condition.
Figure 3:
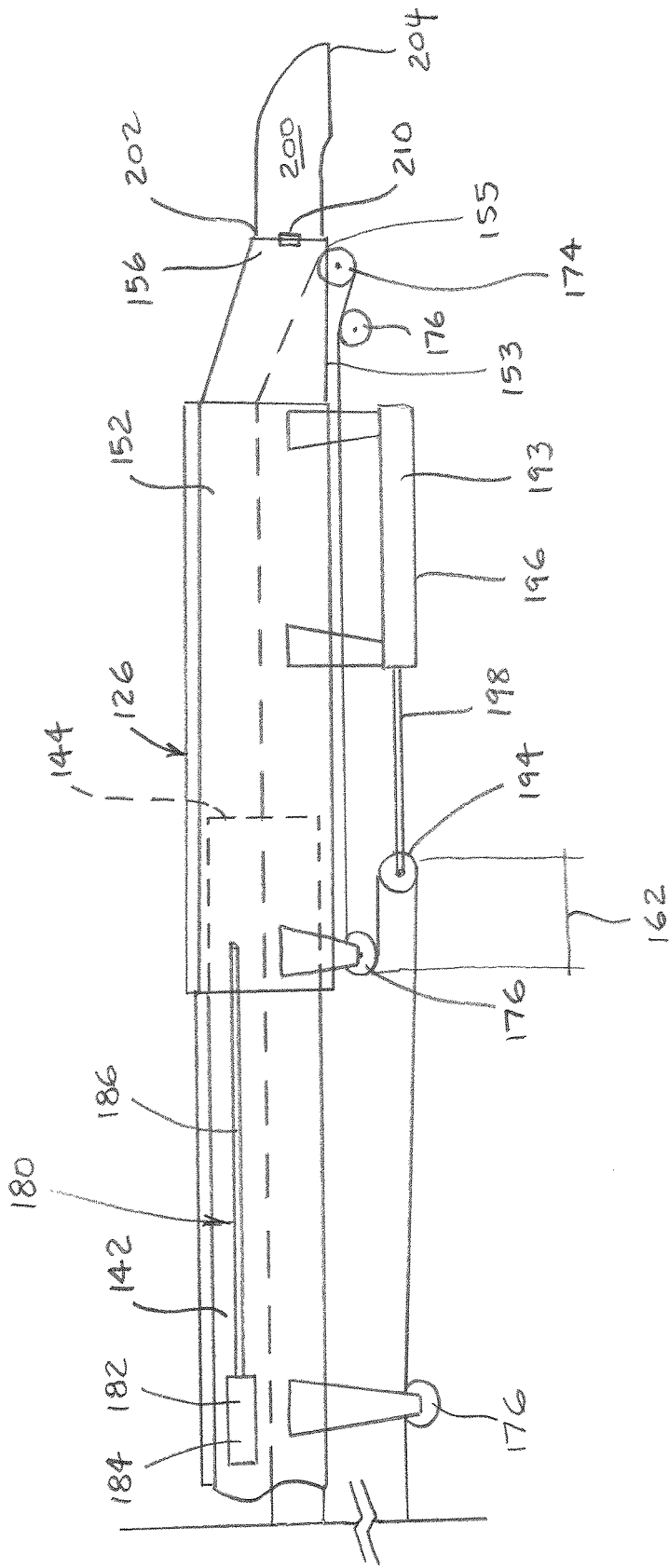
FIG. 3 provides a truncated elevation view of the grain unloading system of FIG. 1, with grain unloading system shown in an extended condition.

Referring to FIGS. 2 and 3, features of conveyor system 100 are shown in more detail. Discharge tube 126 includes two tube sections: a first tube section in the form of a base tube section 142, and a second tube section in the form of an extension tube section 152. Extension tube section 152 is connected to base tube section 142 in an axially adjustable connection. In particular, extension tube section 152 is connected to base tube section 142 in a telescoping relationship that allows the length of discharge tube 126 to be increased or decreased as needed. Base tube section 142 and extension tube section 152 are hollow and collectively define a passage 131 for conveying crop material through the discharge tube. Extension tube section 152 is axially displaceable in a proximal direction and a distal direction relative to base tube section 142. In this arrangement, extension tube section 152 can move distally or away from intake end 130 to increase the effective length of discharge tube 126, and move proximally or toward the intake end to shorten the effective length of the discharge tube.

Conveyor system 100 includes an endless conveyor belt 160 extending through, and movably displaceable within, base tube section 142 and extension tube section 152. A drive mechanism 170 is operable to move conveyor belt 160 through discharge tube 126 to convey crop material through passage 131. Drive mechanisms in accordance with the invention can include a number of different arrangements, including but not limited to a conventional hydraulic or electric motor, belt, shaft, and/or chain drive. In FIG. 2, drive mechanism 170 includes a drive roller 172 positioned in proximity to intake end 130 of discharge tube 126. Conveyor belt 160 is flat as it passes over drive roller 172. As conveyor belt 160 enters discharge tube 126, the conveyor belt transitions from a flat shape to a concave or U-shape as shown to conform to the interior shape of base tube section 142. Conveyor belt 160 passes over the distal end 144 of base tube section 142 and into extension tube section 152, and then exits through an opening 155 in a bottom section 153 of the extension tube section where the conveyor belt transitions from a U-shape to a flat shape. At this point, conveyor belt 160 passes over a discharge roller 174 and winds around idler rollers 176 on its return back to drive roller 172.

Conveyor systems in accordance with the invention can utilize various mechanisms for displacing extension tube section 152 relative to base tube section 142. These mechanisms can include systems for imparting unidirectional force to axially displace the extension tube section 152. For example, these mechanisms can include, but are not limited to, hydraulic cylinders, electrical linear actuators, and motorized rack and pinion systems. In FIG. 2, axial displacement of extension tube section 152 relative to base tube section 142 is controlled by an extension actuator 180 attached between the tube sections. Extension actuator 180 includes a hydraulic cylinder 182 connected to a hydraulic pump (not shown) that supplies pressurized hydraulic fluid to the hydraulic cylinder. Hydraulic cylinder 182 includes a cylinder body 184 attached to base tube section 142 and a piston rod 186 attached to extension tube section 152. Although only one hydraulic cylinder 182 is shown, conveyor systems in accordance with the invention can include one or more hydraulic cylinders in various configurations to displace extension tube section 152.

Extension actuator 180 is configured to axially displace extension tube section 152 relative to base tube section 142 between a fully retracted condition and fully expanded condition. In the fully retracted condition, extension tube section 152 is moved in the proximal direction toward intake end 130 until it cannot move any further in the proximal direction. In this condition, discharge tube 126 has a minimum length. In the fully expanded condition, extension tube section 152 is moved in the distal direction away from intake end 130 until it cannot move any further in the distal direction. In this condition, discharge tube 126 has a maximum length. FIG. 2 shows one possible arrangement representing a fully retracted condition in accordance with the invention, and FIG. 3 shows one possible arrangement representing a fully expanded condition in accordance with the invention. The range of axial displacement or "travel" of extension tube section 152 relative to base tube section 142 can be limited in various ways, including but not limited to providing axial stops between the tube sections and/or by limiting the axial dimensions of the hydraulic cylinders and/or piston rods.

As the effective length of discharge tube 126 changes, the distance between the point where conveyor belt 160 enters the discharge tube and the point where the conveyor belt exits the discharge tube also changes. Therefore, the shape of conveyor belt 160 must adapt to the changes in length of discharge tube 126. However, any change in shape of conveyor belt 160 must not substantially alter the tension on the conveyor belt. If the belt tension changes substantially, then the belt cannot be properly driven. Therefore, conveyor systems in accordance with the invention include constant force take-up systems to maintain proper tension on the belt as the shape of the belt adapts to changes in the effective discharge tube length. In the present example, conveyor system 100 includes a constant force take-up system 190 to maintain proper tension on conveyor belt 160 during displacement of extension tube section 152 relative to base tube section 142.

Constant force take-up system 190 includes a linear actuator 192 and a take-up roller 194. Linear actuators in accordance with the invention can take various forms, including but not limited to a hydraulic cylinder, electrical linear actuator, mechanical spring system, or motorized rack and pinion system. In FIGS. 2 and 3, linear actuator 192 is in the form of a hydraulic cylinder 193 connected to a hydraulic pump (not shown) that supplies pressurized hydraulic fluid to the hydraulic cylinder. Although only one hydraulic cylinder 193 is shown, constant force take-up systems in accordance with the invention can include one or more hydraulic cylinders in various configurations. Hydraulic cylinder 193 includes a cylinder body 196 attached to extension tube section 152 and a piston rod 198 attached to take-up roller 194. Take-up roller 194 is positioned between two of the idler rollers 176 and forms an S-shaped or serpentine section 162 in conveyor belt 160.

Hydraulic cylinder 193 is configured and operable to displace take-up roller 194 relative to the hydraulic cylinder in response to axial displacement of extension tube section 152, so as to maintain constant tension, or substantially constant tension, on conveyor belt. For purposes of this description, "substantially constant" tension preferably means that belt tension remains within plus or minus 2 percent, more preferably within plus or minus 1 percent, and still more preferably within plus or minus 0.5 percent, of the initial tension prior to movement of the extension tube section. As extension tube section 152 is axially displaced to lengthen or shorten discharge tube 126, constant force take-up system 190 changes the shape of conveyor belt 160 accordingly, so that tension in the belt changes as little as possible. The shape of conveyor belt 160 is changed by axial movement of take-up roller 194 relative to hydraulic cylinder 193, which alters the axial length S of serpentine section 162. The change in length of serpentine section 162 can be observed by comparing FIGS. 2 and 3. Hydraulic cylinder 193 moves take-up roller 194 relative to the hydraulic cylinder by a distance D, in response to the travel distance T of extension tube section 152 relative to base tube section 142. Distance D is one half of the travel distance T.

Figure 4:
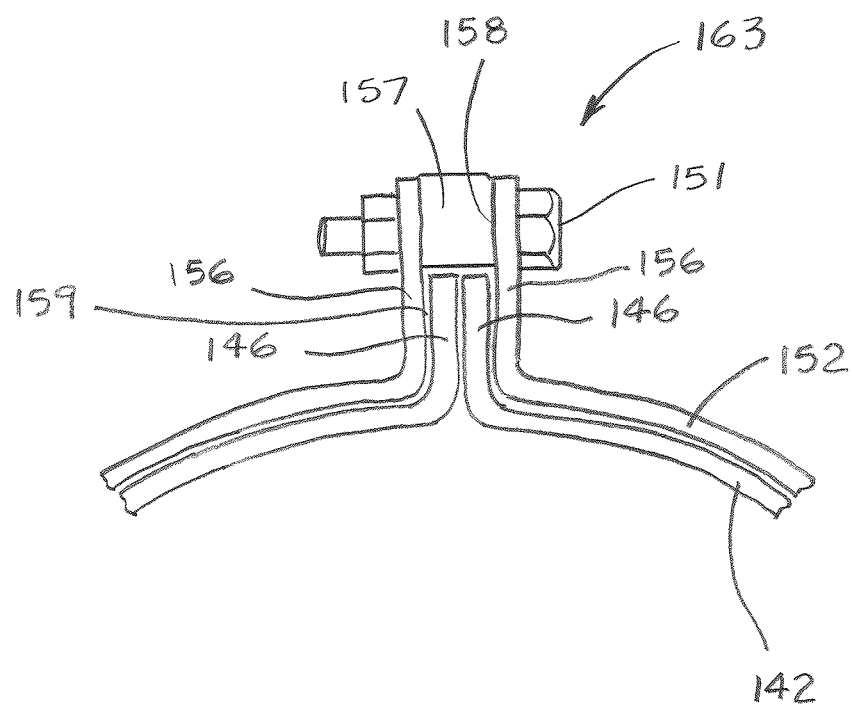
FIG. 4 provides an enlarged truncated cross section view of the grain unloading system of FIG. 1, taken through section 4-4 in FIG. 2.

Discharge tubes in accordance with the invention preferably have one or more anti-rotation mechanisms that prevent the tube sections from rotating relative to one another. In the present example, base tube section 142 and extension tube section 152 are interconnected by a keyed connection 163 shown in FIG. 4. Base tube section 142 has a pair of base tube flanges 146 that extend radially outwardly from the center axis of the base tube section. Extension tube section 152 likewise has a pair of extension tube flanges 156 that extend radially outwardly from the center axis of the extension tube section. Extension tube flanges 156 are separated from one another by a spacer 157 that forms a channel 158 between the extension tube flanges. Spacer 157 and extension tube flanges 156 are secured together by a fastener 151 in the form of a bolt and nut.

Channel 158 is adapted to receive base tube flanges 146, with the base tube flanges separated from extension tube flanges 156 by a sliding clearance 159. Sliding clearance 159 allows extension tube flanges 156 to slide freely over base tube flanges 146 in an axial direction only. That is, extension tube flanges 156 and extension tube section 152 can slide freely over base tube flanges 146 and base tube section 142 in a proximal direction or a distal direction. However, rotation of extension tube section 152 relative to base tube section 142 is prevented by an abutting relationship between base tube flanges 146 and extension tube flanges 156 in a circumferential direction.

Thus far, examples of conveyor systems in accordance with the invention have been discussed mostly as having two tube sections. As described in a previous section, discharge tubes in accordance with the invention can have three or more tube sections, and need not be limited to only two sections. Therefore, it will be understood that an embodiment can have, for example, three tube sections, which would be the same design as the embodiment shown in FIGS. 1-3, except with an additional tube section slidably connected over the distal end of extension tube section 152. The additional tube section could also have an additional extension actuator and an additional constant force take-up system connected to the additional tube section in the same manner that extension actuator 180 and constant force take-up system 190 are connected to extension tube section 152.

In some instances, it may be desirable to not only adjust the axial dimension or length of the conveyor system, but also to adjust the trajectory and flight distance of grain being discharged from the conveyor system. Therefore, conveyor systems in accordance with the invention can also feature extension spouts to facilitate the unloading of grain over a given distance. Extension spouts in accordance with the invention can be used either as an alternative to telescoping extension tube sections, or in addition to telescoping extension tube sections. FIGS. 1-3 show one exemplary embodiment of an extension spout 200 that used in conjunction with extension tube section 152. Extension spout 200 has a proximal end 202 attached to a distal end 156 of extension tube section 152 in a pivotal connection. In particular, extension spout 200 is connected to extension tube section 152 with a vertical hinge 210 that allows the extension spout to pivot or swing relative to distal end 156 of extension tube section 152.

Figure 5:
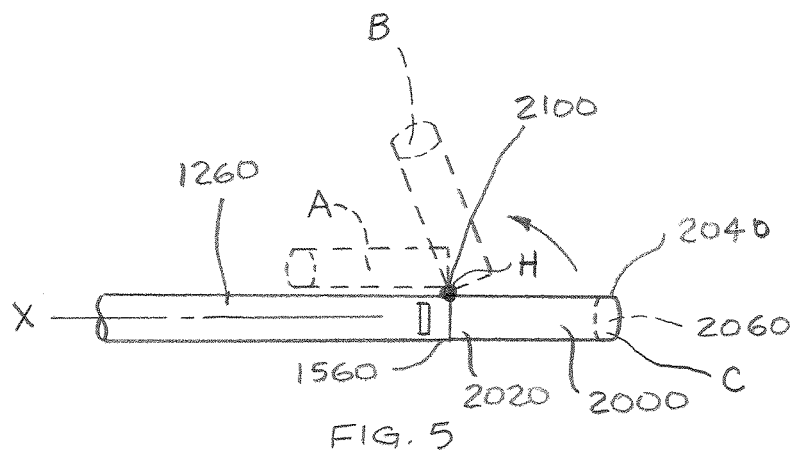
FIG. 5 provides a truncated plan view of a grain unloading system that includes an adjustable extension spout in accordance with an exemplary embodiment of the invention.

Referring to FIG. 5, an extension spout 2000 in accordance with another exemplary embodiment is shown connected to the distal end of a tube section 1260. Tube section 1260 may be the only tube section on a discharge tube, or may be one of a series of tube sections on a discharge tube in a telescoping connection. Extension spout 2000 has a proximal end 2020, a distal end 2040, and an opening 2060 at the distal end for discharging crop material. Proximal end 2020 of extension spout 2000 is pivotally connected to a distal end 1560 of discharge tube 1260 by a hinge 2100. Hinge 2100 is a "vertical hinge" having an axis H (extending into the Figure) that is normal to the axis X of discharge tube 1260.

Extension spout 2000 is pivotally displaceable through an angle of approximately 180 degrees relative to distal end 1560 of tube section 1260. As such, extension spout 2000 is pivotable between a stowed position and an extended position. In the stowed position, extension spout 2000 is folded back, or proximally relative to tube section 1260, with the discharge opening located proximal to hinge 2100. In the extended position, extension spout 2000 projects distally with the discharge opening located distal to hinge 2100. FIG. 5 shows extension spout 2000 in three different positions. In a first position marked "A", spout 2000 is shown in dashed line in the stowed position. In a second position marked "B", spout 2000 is shown in an intermediate position in dashed line, in which the spout is pivoted between the stowed position and extended position. In a third position marked "C", spout 2000 is shown in solid line in the extended position. As can be appreciated from the three views, hinge 2100 allows extension spout 2000 to be pivoted to a more compact arrangement in the stowed position A to reduce the overall footprint of the vehicle when needed, such as during transport.

Extension spouts in accordance with the invention can be made of high strength material such as steel. Alternatively, extension spouts in accordance with the invention can be made of a durable lighter-weight material such as plastic. Lighter-weight extension spouts offer the ability to change the effective length and discharge characteristics of the unloading system without adding significant weight to the structure. Preferably, the weight of the extension spout is a very small fraction of the weight of the remainder of the unloading system. By using lighter-weight materials, the center of gravity of the unloading system does not move outwardly from the vehicle, or moves very little, when the extension spout is attached to the unloading system and extended. In addition, lighter-weight materials minimize damage to grain carts and other receptacles when unloading systems inadvertently contact the receptacles during operation. Furthermore, certain lighter-weight materials require less cost to repair or replace when damaged.

Conveyor systems in accordance with the invention can include a single extension spout as an accessory. The single extension spout can be optionally attached to the unloading system on a hinge or other pivotal connection as described to adjust the axial length and physical reach of the unloading system. Such an accessory can be added to an extendible belt in tube conveyor system in accordance with the invention, such as conveyor system 100. In addition, extension spouts in accordance with the invention can be an accessory for other types of unloading systems. For example, extension spouts in accordance with the invention can be an optional attachment for high-speed belt conveyors with or without tubes, or other types of unloading conveyors.

Figure 6:
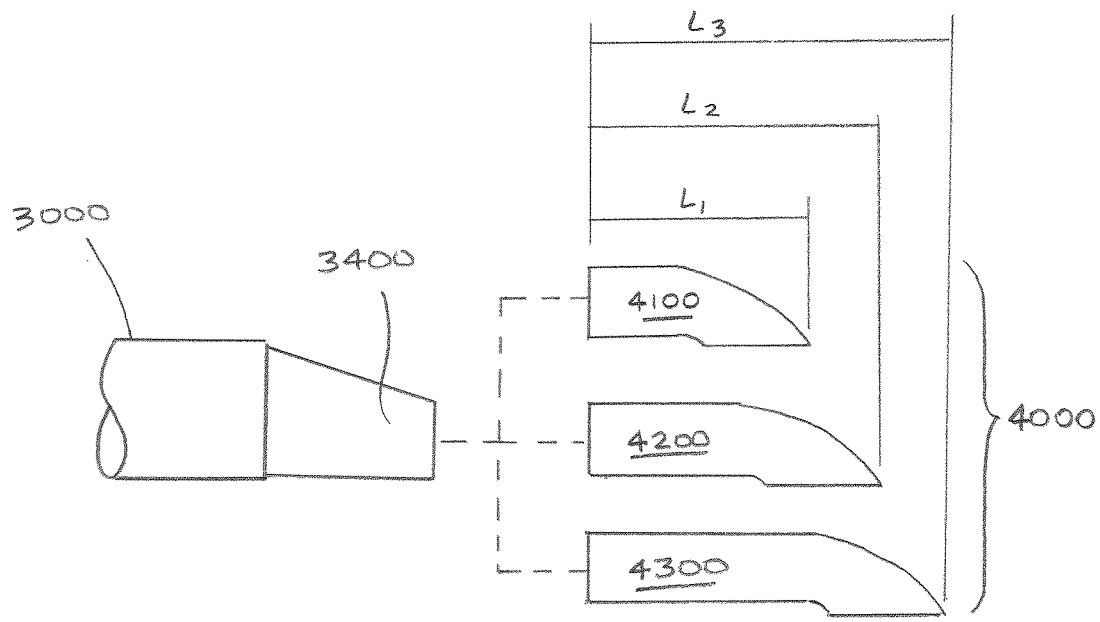
FIG. 6 is a truncated side elevation view of a grain unloading system and set of adjustable extension spouts in accordance with an exemplary embodiment of the invention.

Extension spouts in accordance with the invention can be sold in sets that feature multiple spouts, each spout being configured for attachment to the unloading system. Sets of extension spouts in accordance with the invention can include interchangeable spouts, each spout having unique dimensions and/or curvatures. Sets that feature different dimensions and/or curvatures provide the operator with different options for adjusting the length and/or discharge characteristics of the unloading system. For example, FIG. 6 shows the distal end 3400 of a conveyor system 3000 and a set extension spouts 4000 in accordance with one exemplary embodiment of the invention. Set 4000 includes a short extension spout 4100 having a first axial length $L_1$, an intermediate extension spout 4200 having a second axial length $L_2$ greater than first axial length $L_1$, and a long extension spout 4300 having a third axial length $L_3$ greater than the second axial length $L_2$. For example, short extension spout 4100 could have a length $L_1$ of 1 m, intermediate extension spout 4200 could have a length $L_2$ of 1.75 m, and long extension spout 4300 could have a length $L_3$ of 2.5 m. Extension spouts having shorter and longer dimensions can also be provided and attached to the unloading system to accommodate specific operating conditions. Extension spouts 4100, 4200 and 4300 are each configured to pivotally attach to distal end 3400 of conveyor system 3000, and pivot between stowed positions and extended positions as described with previous embodiments.

What is claimed is:
1. A conveyor system for unloading crop material from an agricultural harvester, the conveyor system comprising:
   an adjustable-length discharge tube for discharging crop material from the agricultural harvester to a location for receiving crop material, the discharge tube having a length, the discharge tube comprising an intake end for receiving crop material into the discharge tube and a discharge end for discharging crop material from the discharge tube, the discharge tube further comprising at least a first tube section and a second tube section, the first tube section movably attached to the second tube section in an adjustable arrangement, the first tube section and the second tube section each being hollow and collectively defining a passage for conveying crop material through the discharge tube, wherein one of the first tube section and the second tube section is movable relative to the other of the first tube section and the second tube section to adjust the length of the discharge tube;
   a single endless conveyor belt extending through and movably displaceable within the first tube section and the second tube section; and
   a constant force take up system for adjusting tension in the conveyor belt in direct response to axial displacement of one of the first tube section and the second tube section relative to the other of the first tube section and the second tube section, so as to maintain a substantially constant tension in the conveyor belt during a change in the length of the discharge tube, the constant force take up system comprising a linear actuator mounted to at least one of the first tube section and the second tube section.

2. The conveyor system of claim 1, wherein the first tube section is movably attached to the second tube section in a telescoping arrangement, with one of the first tube section and second tube section being axially displaceable relative to and receivable within the other of the first tube section and the second tube section.

3. The conveyor system of claim 1, wherein the conveyor belt comprises a first portion that extends through the first tube section and second tube section, and a second portion that travels outside the first tube section and second tube section during any given time.

4. The conveyor system of claim 1, further comprising a drive mechanism operable to move the conveyor belt through the discharge tube to convey crop material through the passage in the discharge tube.

5. The conveyor system of claim 4, wherein the drive mechanism comprises a drive roller positioned in proximity to the intake end of the discharge tube.

6. The conveyor system of claim 1, further comprising an extension actuator attached between the first tube section and the second tube section, the extension actuator configured to axially displace one of the first tube section and the second tube section relative to the other of the first tube section and the second tube section to change the length of the discharge tube.

7. The conveyor system of claim 6, wherein the extension actuator is configured to axially displace one of the first tube section and the second tube section relative to the other of the first tube section and the second tube section between a fully retracted condition and fully expanded condition, the discharge tube having a minimum length when in the fully retracted condition, and a maximum length when in the fully expanded condition.

8. The conveyor system of claim 6, wherein the extension actuator is a hydraulic cylinder.

9. The conveyor system of claim 1, wherein the constant force take up system further comprises a linear actuator mounted to at least one of the first tube section and the second tube section.

10. The conveyor system of claim 9, wherein the linear actuator is a hydraulic cylinder or a mechanical spring system mounted to one of the first tube section and the second tube section.

11. The conveyor system of claim 9, wherein the constant force take-up system further comprises a take-up roller connected to the linear actuator.

12. The conveyor system of claim 2, wherein the first tube section is telescopically received in the second tube section.

13. The conveyor system of claim 2, wherein the first tube section comprises a first anti-rotation feature and the second tube section includes a second anti-rotation feature that cooperatively engages the first anti-rotation feature to limit rotation of the second tube section relative to the first tube section.

14. The conveyor system of claim 2 further comprising a third tube section.

15. The conveyor system of claim 14, wherein the third tube section comprises an extension spout, the extension spout having a spout length and a discharge opening.

16. The conveyor system of claim 15, wherein the extension spout is pivotally connected to a distal end of one of the first tube section and the second tube section by a hinge.

17. The conveyor system of claim 16, wherein the axis of the hinge is normal to the axis of discharge tube.

18. The conveyor system of claim 17, wherein the extension spout is pivotally displaceable through an angle of about 180 degrees between a stowed position, in which the extension spout is folded proximally with the discharge opening located proximal to the hinge, and an extended position, in which the extension spout projects distally with the discharge opening located distal to the hinge.

19. The conveyor system of claim 15 further comprising at least one alternate extension spout, the at least one alternate extension spout having a spout length that is different from the spout length of the extension spout, and being interchangeable with the extension spout to adjust the length of the discharge tube.

20. The conveyor system of claim 1, wherein the second tube section is an extension spout pivotally connected to a distal end of the first tube section by a hinge.

* * * * *